J. H. MASON.
EMERGENCY HUB.
APPLICATION FILED OCT. 9, 1918.
1,313,405.
Patented Aug. 19, 1919.
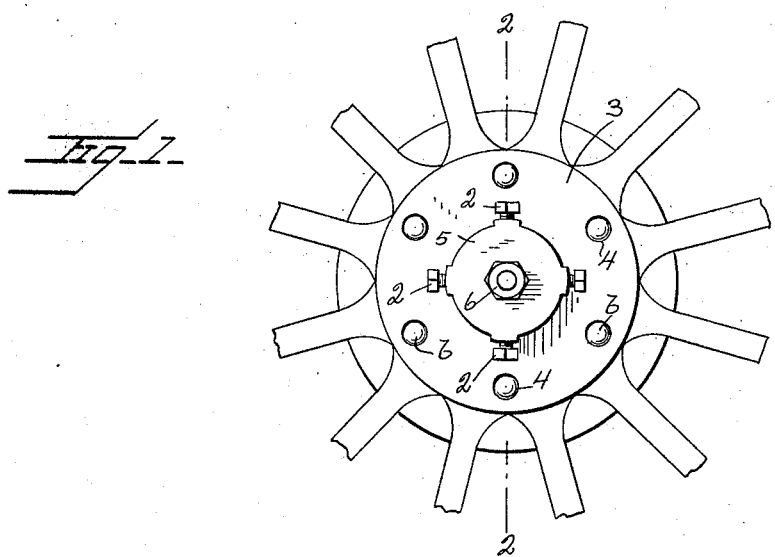
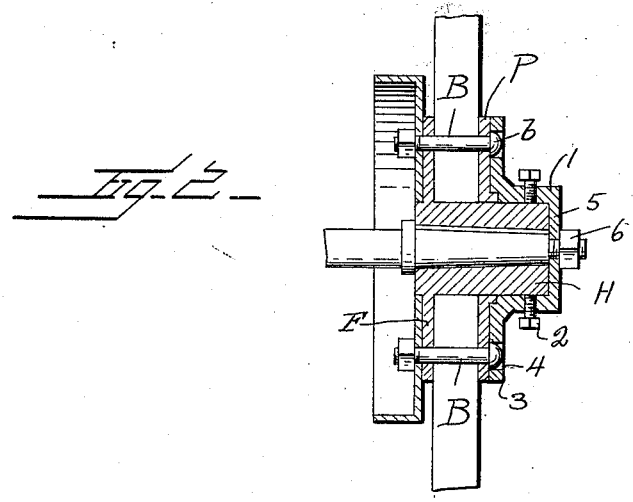
Inventor
J. H. Mason
By Watson E. Coleman
Attorney

UNITED STATES PATENT OFFICE.

JOHN H. MASON, OF HEAVENER, OKLAHOMA.

EMERGENCY-HUB.

1,313,405.   Specification of Letters Patent.   Patented Aug. 19, 1919.

Application filed October 9, 1918. Serial No. 257,454.

*To all whom it may concern:*

Be it known that I, JOHN H. MASON, a citizen of the United States, residing at Heavener, in the county of Le Flore and State of Oklahoma, have invented certain new and useful Improvements in Emergency-Hubs, of which the following is a specification, reference being had to the accompanying drawings.

This invention relates to certain improvements in emergency hubs, and has relation more particularly to a device of this general character especially designed and adapted for use in connection with a hub of the rear or driving wheel type employed in connection with the well known Ford car, and it is an object of the invention to provide a novel and improved device of this general character which may be readily and effectively applied, and which serves to assure the proper rotation of the wheel, particularly in the event of the fracture of a hub flange and more particularly the inner or rear flange.

The invention consists in the details of construction and in the combination and arrangement of the several parts of my improved emergency hub whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood I will now proceed to describe the same with reference to the accompanying drawings, wherein:

Figure 1 is a view in elevation illustrating an emergency hub constructed in accordance with an embodiment of my invention and in applied position, the coacting wheel structure being shown in fragment; and Fig. 2 is a sectional view taken substantially on the line 2—2 of Fig. 1.

As disclosed in the accompanying drawings, H denotes a hub of the type employed in connection with the rear or driving wheel generally employed in connection with a Ford automobile. F denotes the rear hub flange or plate and P denotes the outer and removable hub plate or flange carried by said hub H and through which are disposed the hub bolts B having their heads *b* outwardly disposed in the well known manner.

My improved emergency hub comprises a cylindrical body or sleeve 1 adapted to snugly fit upon the outer portion of the hub, and threaded through said body or sleeve 1 are the set screws 2, preferably four in number and equidistantly spaced whereby the body or sleeve 1 is effectually locked to the hub H.

The inner end portion of the sleeve or body 1 is defined by the outstanding annular flange 3 which has contact, when the emergency hub is applied with the outer face of the hub plate P and the outer marginal portion of the flange 3 is provided with cavities or openings 4 to receive the heads *b* of the bolts B.

I also find it of advantage to provide the outer end portion of the body or sleeve 1 with the inwardly directed annular flange 5 which overlies the outer end of the hub H and with which the axle nut 6 is adapted to contact, so that the nut 6 will afford a further means for holding the body or sleeve 1 in applied position.

In practice I have found my improved emergency hub to be of particular advantage in the event the hub plate F becomes fractured or otherwise unfit for use and whereby my improved emergency hub affords means whereby the car may be temporarily repaired so that the same may be driven home or to some place where the hub may be repaired. In applying my improved emergency hub, it is to be understood that the hub cap generally employed is removed. It often occurs that the rear flange F breaks and allows the hub H proper to turn in the wheel proper and which, of course, results in the stopping of the machine. In such an event my improved emergency hub readily overcomes this disadvantage.

From the foregoing description, it is thought to be obvious that an emergency hub constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice except as hereinafter claimed.

I claim:

1. An emergency hub of the class described comprising a sleeve provided at one end portion with an outstanding annular flange, said flange being provided with cavities, and means carried by the sleeve for securing the sleeve to the hub of a wheel for rotation therewith.

2. An emergency hub of the class described comprising a sleeve provided at one end portion with an outstanding annular flange, said flange being provided with cavities, and set screws threaded through the sleeve.

3. In combination with a wheel hub provided with a hub plate, and bolts extending through the plate, a sleeve snugly engageable with an end portion of the hub, means carried by the sleeve for binding engagement with the hub, said sleeve being provided with an outstanding flange for contact with the hub plate, said flange having cavities to receive end portions of the bolts.

4. In combination with a wheel hub provided with a hub plate, and bolts extended through the plate, a sleeve snugly engageable with an end portion of the hub, means carried by the sleeve for binding engagement with the hub, said sleeve being provided with an outstanding flange for contact with the hub plate, said flange having cavities to receive end portions of the bolts, said sleeve being also provided with an inwardly directed flange to overlie the outer end of the hub.

In testimony whereof I hereunto affix my signature in the presence of two witnesses.

JOHN H. MASON.

Witnesses:
E. O. DAVENPORT,
J. W. TOMLIN.

Copies of this patent may be obtained for five cents each, by addressing the "Commissioner of Patents, Washington, D. C."